United States Patent
Silverberg et al.

(10) Patent No.: US 8,719,110 B1
(45) Date of Patent: May 6, 2014

(54) DISCOUNT OFFERS BASED ON A SOCIAL GRAPH

(75) Inventors: Stephen Blair Silverberg, Palo Alto, CA (US); Hendro Riyadi, San Jose, CA (US); Jonathan P. Ku, Braintree, MA (US); Bryan K. Tublin, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 314 days.

(21) Appl. No.: 13/176,816

(22) Filed: Jul. 6, 2011

(51) Int. Cl.
*G06Q 30/00* (2012.01)

(52) U.S. Cl.
USPC ........... 705/26.2; 705/7.11; 705/27; 705/80; 705/7.42; 705/14.52; 235/383; 235/381

(58) Field of Classification Search
USPC ............ 705/26.2, 37, 27, 80, 38, 14.52, 400
See application file for complete search history.

(56) References Cited

U.S. PATENT DOCUMENTS

| | | | |
|---|---|---|---|
| 6,269,343 B1 * | 7/2001 | Pallakoff | 705/26.2 |
| 7,689,482 B2 * | 3/2010 | Lam et al. | 705/34 |
| 7,895,080 B2 * | 2/2011 | Haynes et al. | 705/26.41 |
| 7,912,761 B2 * | 3/2011 | Vaid | 705/26.2 |
| 8,050,982 B2 * | 11/2011 | Lin | 705/26.3 |
| 8,224,704 B2 * | 7/2012 | Harada et al. | 705/26.7 |
| 2012/0084166 A1 * | 4/2012 | Van Luchene et al. | 705/26.2 |
| 2012/0209740 A1 * | 8/2012 | Mesaros | 705/26.2 |

* cited by examiner

*Primary Examiner* — Vanel Frenel
(74) *Attorney, Agent, or Firm* — Park, Vaughan, Fleming & Dowler LLP; Steven E. Stupp (57) ABSTRACT

During a marketing technique, lists of desired items and associated prices are received from multiple consumers. For example, consumers may provide lists of desired items and the (discounted) prices at which these items are of interest. By assigning the consumers to different price ranges based on the associated prices and an occurrence of at least one of the items in the lists, an aggregated interest in the item, including numbers of consumers that desire the item in the different price ranges, is determined. Information associated with the aggregated interest in the item is then provided to at least one entity that provides the item, thereby facilitating sales of the item to a subset of the consumers associated with one or more of the price ranges.

20 Claims, 6 Drawing Sheets

DISCOUNT OFFERS BASED ON A SOCIAL GRAPH

BACKGROUND

The present disclosure relates to techniques for providing different discount offers to consumers based on lists of products that are desired by consumers.

Discount offers, such as coupons, are often used by businesses to attract customers. A common type of discount offer is a volume discount. This type of discount offer uses a reduced unit price to reward large-scale purchases of a product or a service. In this way, the manufacturer or the provider of the product or service can move large volumes of inventory in a short period of time, and can leverage the advantages associated with increased economy of scale.

Historically, volume discounts were only available to large entities that were able to purchase products and services in bulk. However, websites have recently been developed that allow individual consumers to receive volume discounts. In particular, so-called 'deal' websites aggregate large numbers of consumers into a group, and then offer the purchasing power of the aggregated group to manufacturers and providers of products and services. Typically, this results in the members of the group receiving a discounted price on a particular product or service each day (the so-called daily 'deal').

While this approach offers the advantages of volume discounts to individual consumers, the discounts often are for products and services that may not be relevant or of interest to a given consumer in the group. As a consequence, the volume discounts often are not useful for this consumer. This can be frustrating for the consumers, and may reduce their interest in the deal websites.

SUMMARY

The disclosed embodiments relate to a computer system that provides information associated with an aggregated interest. During operation, the computer system receives lists of desired items and associated prices from multiple consumers, where a given list is associated with a given consumer, and a given item in the given list is associated with a given price. In response, for at least one of the items, the computer system assigns the consumers to different price ranges based on occurrences of the item in the lists of desired items and the associated prices, thereby determining the aggregated interest in the item, where the aggregated interest includes numbers of consumers that desire the item in the different price ranges. Furthermore, the computer system provides the information associated with the aggregated interest in the item to at least one entity that provides the item, thereby facilitating sales of the item to a subset of the consumers associated with one or more of the price ranges.

Note that the item may include a product or a service. Furthermore, the entity may include a merchant that sells the item or a manufacturer that produces the item.

After assigning the consumers to the different price ranges, the computer system may determine the subset of the consumers by comparing the different prices ranges to a threshold value.

In some embodiments, after providing the information, the computer system: receives sales information for the subset of the consumers from the entity, where the sales information includes invoices; and provides financial information associated with the subset of the consumers to the entity, thereby completing the sales of the item. Moreover, prior to providing the financial information, the computer system may receive the financial information from at least the subset of the consumers.

Alternatively or additionally, after providing the information, the computer system: receives sales information for the subset of the consumers from the entity; and provides the sales information to the subset of the consumers. This sales information may include invoices or discount offers.

In some embodiments, after receiving the lists of desired items, the computer system may provide feedback to a given consumer that indicates a probability that an associated price for the item provided by the given consumer will result in a sale of the item to the consumer by the entity. Alternatively or additionally, prior to providing the information, the computer system may: estimate profitability of the sales of the item to the subset of consumers; and provide information about the estimated profitability to the entity, thereby facilitating identification of the subset of the consumers.

In some embodiments, prior to providing the information, the computer system: determines investment-suitability metrics for the consumers based on financial-transaction histories of the consumers, where an investment-suitability metric for the given consumer specifies a probable return on investment associated with a sale made to the given consumer; and provides the investment-suitability metrics to the entity, thereby facilitating identification of the subset of the consumers.

In some embodiments, after assigning the consumers to the different price ranges, the computer system: extracts additional information from the aggregated interest; and provides the additional information to a third party, which can be the entity or other than the entity. For example, the additional information may include: financial-forecast information, investment information, marketing information, and/or consumer-demand information.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for providing information associated with an aggregated interest, and a computer-program product (e.g., software) for use with the computer system are described. During a marketing technique, lists of desired items and associated prices are received from multiple consumers. For example, consumers may provide lists of desired items and the (discounted) prices at which these items are of interest. By assigning the consumers to different price ranges based on the associated prices and an occurrence of at least one of the items in the lists, an aggregated interest in the item, including numbers of consumers that desire the item in the different price ranges, is determined. Moreover, after assigning the consumers to the different price ranges, a subset of the consumers may be determined by comparing the different prices ranges to a threshold value. Then, information associated with the aggregated interest in the item is provided to at least one entity that provides the item, thereby facilitating sales of the item to a subset of the consumers associated with one or more of the price ranges.

In this way, the marketing technique may allow consumers to receive the benefits of a volume discount on an item that is of interest to them. Consequently, this marketing technique may increase the relevance (and, thus, the usefulness) of the volume discount, with a commensurate impact on consumer satisfaction and retention by a provider of the marketing technique. At the same time, the marketing technique allows the provider of the item control of the process (by allowing them to specify the threshold value, such as a price point and/or a number of consumers in the one or more price ranges), and allows the provider to accrue the advantages of economies of scale and the ability to move a large volume of the item in a short time interval (which may be useful in inventory management).

In the discussion that follows, the user may include one of a variety of entities, such as: an individual (for example, an existing customer, a new customer, a service provider, a vendor, a contractor, etc.), an organization, a business and/or a government agency. Furthermore, a 'business' (such as the 'entity' described below) should be understood to include: for-profit corporations, non-profit corporations, organizations, groups of individuals, sole proprietorships, government agencies, partnerships, etc.

Figure 1:
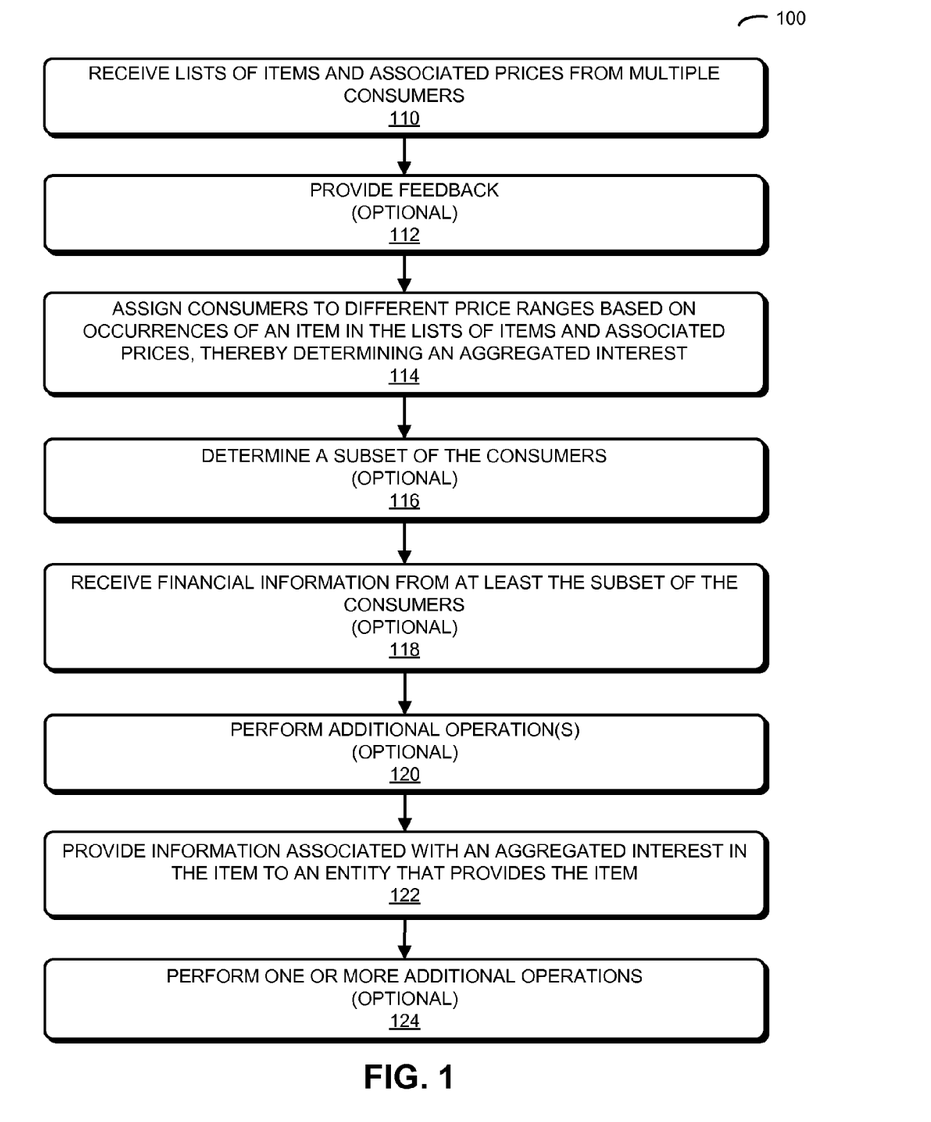
FIG. 1 is a flow chart illustrating a method for providing information associated with aggregated interest in accordance with an embodiment of the present disclosure.

We now describe embodiments of the marketing technique. FIG. 1 presents a flow chart illustrating a method 100 for providing types of discount offers, which may be performed by a computer system (such as server 212 in FIGS. 2 and 4, and/or computer system 500 in FIG. 5). During operation, the computer system receives lists of desired items and associated prices from multiple consumers (operation 110), where a given list is associated with a given consumer, and a given item in the given list is associated with a given price. In response, for at least one of the items (such as a product or a service), the computer system assigns the consumers to different price ranges based on occurrences of the item in the lists of desired items and the associated prices (operation 114), thereby determining the aggregated interest in the item, where the aggregated interest includes numbers of consumers that desire the item in the different price ranges.

After assigning the consumers to the different price ranges, the computer system may optionally determine the subset of the consumers by comparing the different prices ranges to a threshold value (operation 116).

Furthermore, the computer system provides the information associated with the aggregated interest in the item to at least one entity that provides the item (operation 122), thereby facilitating sales of the item to a subset of the consumers associated with one or more of the price ranges. For example, the entity may include a merchant that sells the item or a manufacturer that produces the item (and, more generally, a business).

In some embodiments, after providing the information, the computer system performs one or more optional additional operations (operation 124). For example, the computer system may: receive sales information for the subset of the consumers from the entity, where the sales information includes invoices; and provide financial information associated with the subset of the consumers to the entity, thereby completing the sales of the item. Moreover, prior to providing the financial information, the computer system may optionally receive the financial information from at least the subset of the consumers (operation 118).

Alternatively or additionally, when performing the one or more optional additional operations (operation 124) the computer system may: receive sales information for the subset of the consumers from the entity; and provide the sales information to the subset of the consumers. This sales information may include invoices or discount offers.

In some embodiments, after receiving the lists of desired items (operation 110), the computer system may optionally provide feedback to a given consumer that indicates a probability that an associated price for the item provided by the given consumer will result in a sale of the item to the consumer by the entity (operation 112).

Prior to providing the information, the computer system may perform one or more optional additional operations (operation 120). For example, the computer system may: estimate profitability of the sales of the item to the subset of consumers; and provide information about the estimated profitability to the entity, thereby facilitating identification of the subset of the consumers.

Alternatively or additionally, when performing the one or more optional additional operations (operation 120), the computer system may: determine investment-suitability metrics for the consumers based on financial-transaction histories of the consumers, where an investment-suitability metric for the given consumer specifies a probable return on investment associated with a sale made to the given consumer; and provide the investment-suitability metrics to the entity, thereby facilitating identification of the subset of the consumers.

In some embodiments, after assigning the consumers to the different price ranges, the computer system: extracts additional information from the aggregated interest; and provides the additional information to a third party, which can be the entity or other than the entity. For example, the additional information may include: financial-forecast information, investment information, marketing information, and/or consumer-demand information.

Figure 2:
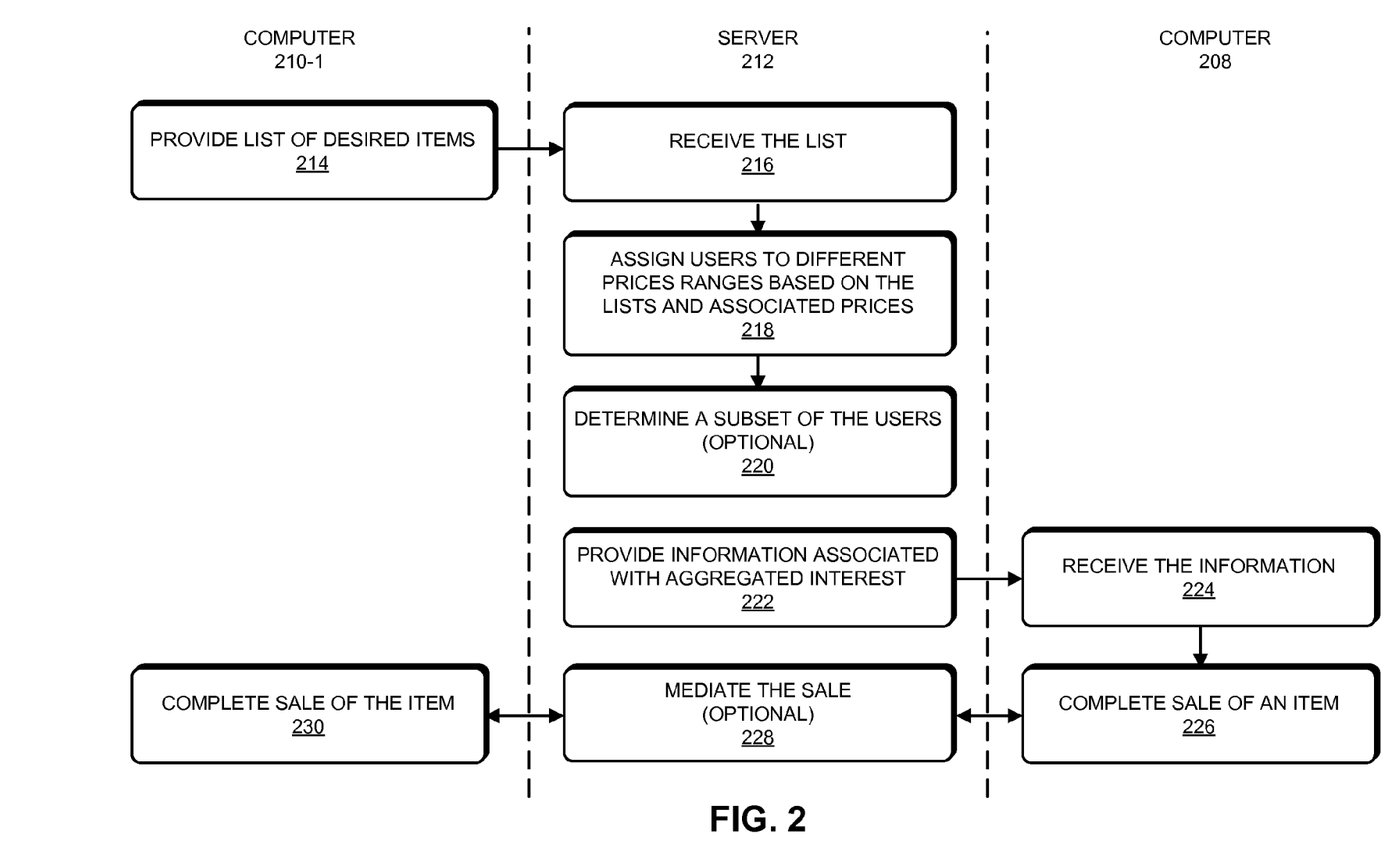
FIG. 2 is a flow chart illustrating the method of FIG. 1 in accordance with an embodiment of the present disclosure.

In an exemplary embodiment, the marketing technique is implemented using one or more computers and at least one server computer, which communicate through a network, such as the Internet (e.g., using a client-server architecture). This is illustrated in FIG. 2, which presents a flow chart illustrating method 100. During this method, a user of computer 210-1 provides a list of desired items and associated prices (operation 214), which is subsequently received by server 212 (operation 216).

Using this list and other lists received from additional users, for at least one of the items (such as a product or a service) server 212 may assigns the users to different price ranges based on occurrences of the item in the lists of desired items and the associated prices (operation 218), thereby determining the aggregated interest in the item, where the aggregated interest includes numbers of consumers that desire the item in the different price ranges.

Next, server 212 may optionally determine the subset of the users (operation 220) by comparing the different prices ranges to a threshold value.

Furthermore, server 212 may provide the information (operation 222) associated with the aggregated interest in the item to at least one entity that provides the item (such as a merchant or a manufacturer), thereby facilitating sales of the item to a subset of the consumers associated with one or more of the price ranges. For example, the subset may include those consumers who specified prices for the item that equal or exceed a threshold value. Alternatively or additionally, the threshold value may specify the number of consumers in the subset.

This information is subsequently received by computer 208 (operation 224), which is associated with the entity. In response to the provided information, computer 208 either completes the sale of the item to the users (including the user) directly (operations 226 and 230) or optionally mediates the sale via server 212 (operation 228). For example, server 212 may receive sales information (such as an invoice) from computer 208, and in response server 212 may provide financial information (such as payment information, including an amount, an account number, etc.) to computer 208. Alternatively, after receiving the sales information (such as an invoice or a discount offer, e.g., a coupon), server 212 may provide it to computer 210.

In some embodiments of method 100 (FIGS. 1 and 2) there may be additional or fewer operations. For example, server 212 may extract additional information from the price elasticity of demand, and this information may be provided to a third party, which can be the entity or other than the entity. This additional information may indicate products or services that are of interest to consumers. Consequently, the additional information may include: financial-forecast information (for example, for the entity), investment information (for example, for the entity), marketing information (for example, for the item), and/or consumer-demand information (such as a sales forecast for the item). Alternatively or additionally, user acceptance of the discount offers may be tracked and used to revise or update the marketing campaign based on the conversion rates of the discount offers. Moreover, the order of the operations may be changed, and/or two or more operations may be combined into a single operation.

Figure 3:
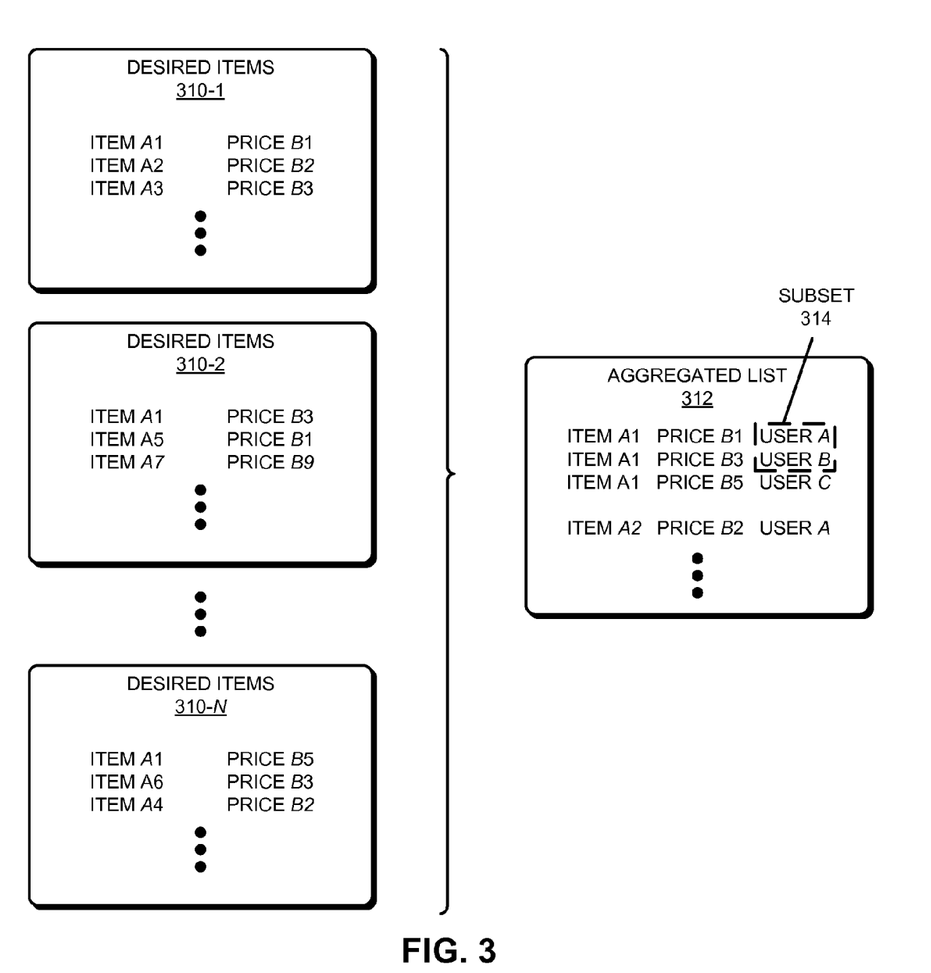
FIG. 3 is a block diagram illustrating the determining of the aggregated interest in items in accordance with an embodiment of the present disclosure.

This marketing technique facilitates the creation of personalized, specific deals by allowing consumers to generate a list of items they would be interested in purchasing at particular prices. These lists are then aggregated and compared, with a given price bucket assigned to a given product along with the associated number of consumers who will purchase the given product at a particular price. At certain threshold(s), product and service sellers (i.e., providers) are alerted to this aggregated interest, which allows them to immediately sell their products or services to at least a subset of the consumers in the aggregated group. The marketing technique is illustrated in FIG. 3, which presents a block diagram illustrating the aggregation of lists of desired items 310 into aggregated list 312 (or aggregates interest in the items), which includes subset 314.

The end result of this process is coordinated, collective bargaining by a group of consumers who do not know each other, in order to achieve a volume pricing discount on an item that they were interested in purchasing but may not have purchased at prevailing prices. Thus, by leveraging a social graph, the marketing technique may represent a more natural way of shopping to the consumers because the discount offers are based on or driven by what the consumers need (as opposed to what providers of the products or services want to offer). Thus, the embodiments of the marketing technique may represent the opposite approach to the types of daily deals offered by so-called 'deal' websites and applications.

As noted previously, the marketing technique may facilitate inventory management. For example, a merchant may be able to sell large amount of inventory immediately. Moreover, a manufacturer of a product may use this approach as prepayment or collateral in order to fund production of the goods being offered.

In some embodiments, subset 314 of aggregated list 312 may be tailored based on additional information. For example, information in financial-transaction histories of the consumers (such as previous financial transactions) may be used to determine whether a discount offer to a given consumer is likely to be profitable. In particular, the financial-transaction histories may be used to determine which consumers are likely to continue purchasing a discounted product or a service for a period of time, thereby ensuring that accepted discount offers will be profitable for the entity. Thus, in some embodiments financial-transaction histories (such as those associated with financial software, e.g., payroll software, accounting software and/or income-tax preparation software) are used to determine the likely return on investment for different consumers in the aggregated group, and the return on investment may be used to select the subset.

The marketing approach may be offered as a value-added service to businesses by a third party. This third party may be compensated with a percentage of the offered or accepted discounts. Furthermore, the third party may sell data about accepted offers and the lists of desired items (which may be used for purposes of marketing, financial forecasting and/or investing). In some embodiments, information about the items (and associated prices) in desired items 310 that do not result in discount offers may be aggregated and sold.

In an exemplary embodiment, the marketing technique is implemented using a social network (although a wide variety of platforms may be used). When a user of a social network sees a product or service referenced by a friend in a 'news' feed, they can flag the reference to indicate that they also want this item, and they can specify a price that they are willing to pay for it.

This type of response may be repeated by other users, and the specified 'desired' items may be aggregated. For example, the data from the users may be segregated according to specific products or services (such as by mapping the items according to barcodes). Then, for each of the products or services, the prices that the users specified may be listed along with identifiers linking them to the associated users. The end result of this process is an aggregated set of items along with user/price pairs (which, for a large enough group of users, is the price elasticity of demand).

This aggregated information can then be subdivided and provided to businesses that provide the products or services. For example, a business may be alerted that there are X users who are willing to purchase Y at price Z. This notification process may be administered via a website and/or by using email.

If the provider of a particular product or service decides not to sell to a subset of the users at a given price (e.g., discount offers are not provided), the users may be notified that their offered price was rejected, and they may be encouraged to join another current discount campaign(s). Alternatively, if the offered price was accepted by the provider, emails may be sent to the users notifying them to complete the transaction through the marketing-technique website. To help ensure that the users do not sign up for the service without paying for approved transactions, the users may prepay for the product or service at the specified price in their lists (for example, by providing financial information, such as credit-card or bank-account information). This prepayment may be refunded if the offered price is rejected by the provider.

Figure 4:
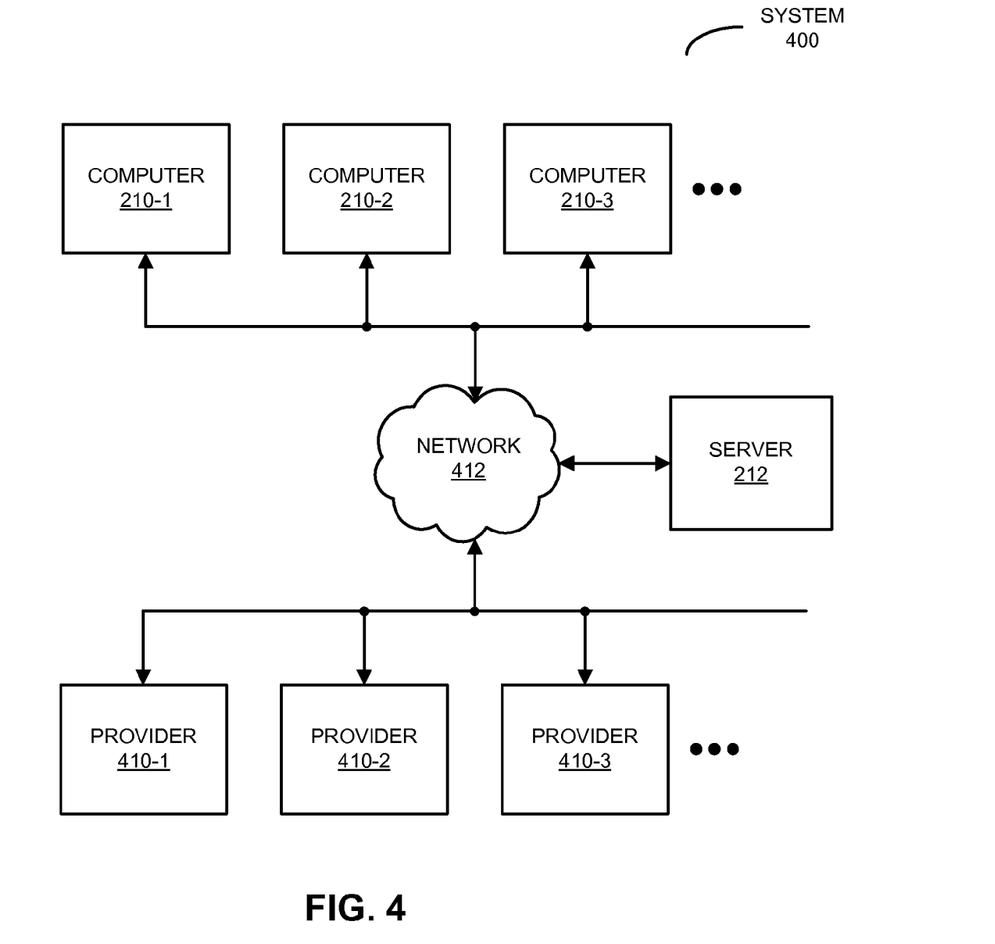
FIG. 4 is a block diagram illustrating a computer system that performs the method of FIGS. 1 and 2 in accordance with an embodiment of the present disclosure.

We now describe embodiments of the computer system and its use. FIG. 4 presents a block diagram illustrating a system 400 that performs method 100 (FIGS. 1 and 2). In this system, a user of computer 210-1 may use a software product, such as social-network software. For example, the user may interact with a web page that is provided by server 212 via network 412, and which is rendered by a web browser on computer 210-1. Alternatively, the user may use a social-network software application that is resident on and that executes on computer 210-1. This social-network software application may be a stand-alone application or a portion of another application that is resident on and which executes on computer 210-1 (such as social-network software that is provided by server 212 or that is installed and which executes on computer 210-1).

In some embodiments, at least a portion of the social-network software application may be an application tool (such as a social-network software application tool) that is embedded in the web page (and which executes in a virtual environment of the web browser). Thus, the social-network software application tool may be provided to the user via a client-server architecture.

As discussed previously, the user may indicate desired items and associated prices while using the social-network software. This information may be communicated to server 212 via network 412. Moreover, for one or more of the items, server 212 may aggregate these lists from multiple users of computers 210 to determine the aggregated interest in the one or more items. In particular, server 212 may assigns the consumers to different price ranges based on occurrences of the one or more items in the lists of desired items and the associated prices. In some embodiments, server 212 then optionally determines a subset of the consumers by comparing the different prices ranges to a threshold value.

Furthermore, server 212 may provide information associated with the aggregated interest in the one or more items to at least one of providers 410 (such as provider 410-1) using network 412 (for example, server 212 may send an email to provider 410-1). In response, this provider may complete sales of the one or more items to users in the subset, which may include the user of computer 210-1. As noted previously, provider 410-1 may complete the sale by interacting directly with the user (for example, via network 412) or indirectly (for example, via server 212). For example, based on information received from provider 410-1, server 212 may send emails with discount information to computers of the users in the subset. Alternatively or additionally, in response to sales information (such as invoices) from provider 410-1 (which is received via network 412), server 212 may provide financial information (including payment information or instructions) for the users in the subset to provider 410-1 using network 412. (Note that the financial information may have been previously received by server 212 from the users via network 412, for example, the users may have provided the payment information when they set up their social-network accounts.)

Note that the information and/or the additional information in system 400 may be stored at one or more locations in system 400 (i.e., locally or remotely). Moreover, because this data may be sensitive in nature, it may be encrypted. For example, stored data and/or data communicated via network 412 may be encrypted.

Figure 5:
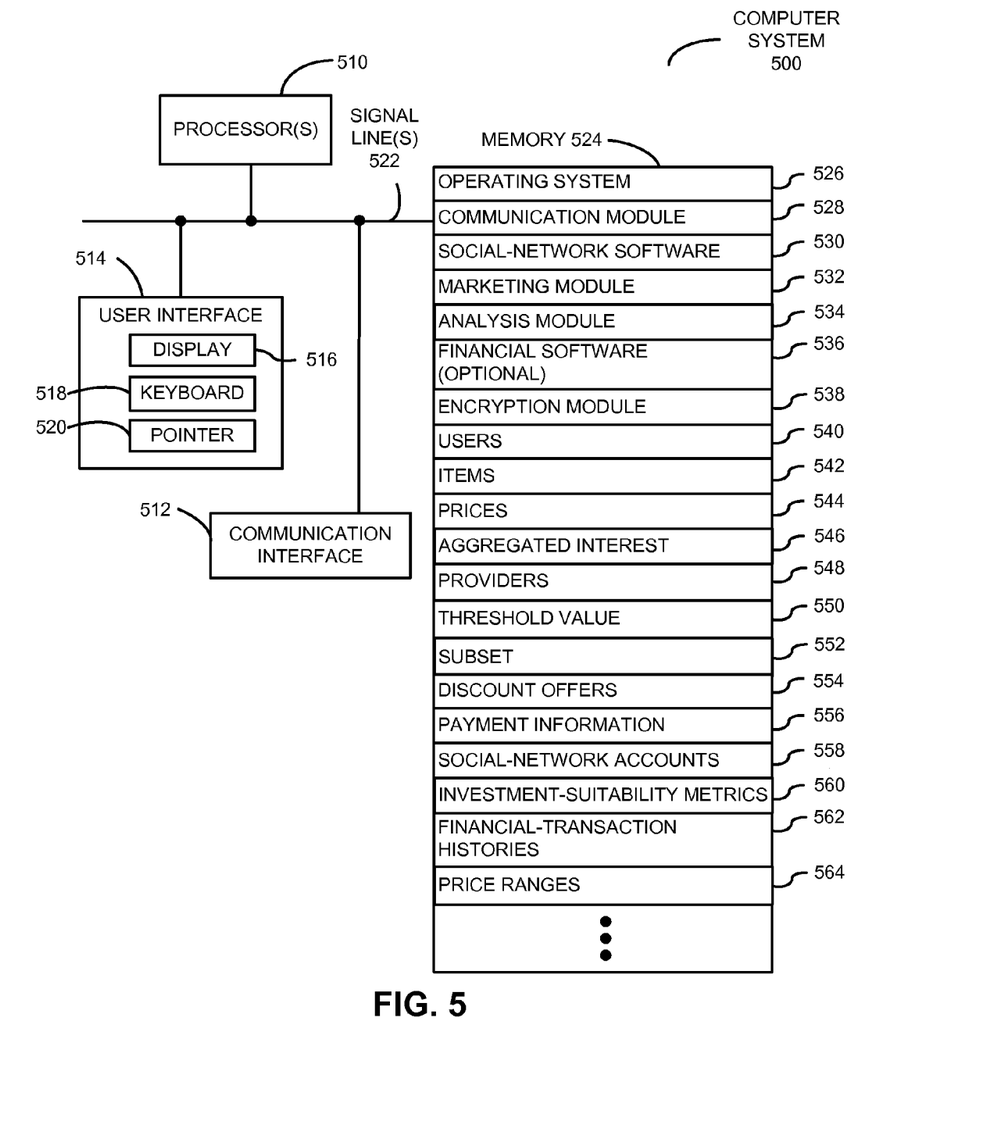
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as server 212 (FIG. 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: social-network software 530 (or a set of instructions), marketing module 532 (or a set of instructions), analysis module 534 (or a set of instructions), optional financial software 536 (or a set of instructions) and/or encryption module 538 (or a set of instructions). Note that one or more of these program modules (or sets of instructions) may constitute a computer-program mechanism.

During method 100 (FIGS. 1 and 2), users 540 may indicate desired items 542 and associated prices 544 while using social-network software 530. Then, analysis module 534 may assign items 542 and associated prices 544 from users 540 into price ranges 564 to determine aggregated interest 546 for items 542, such as products or services offered by providers 548.

Figure 6:
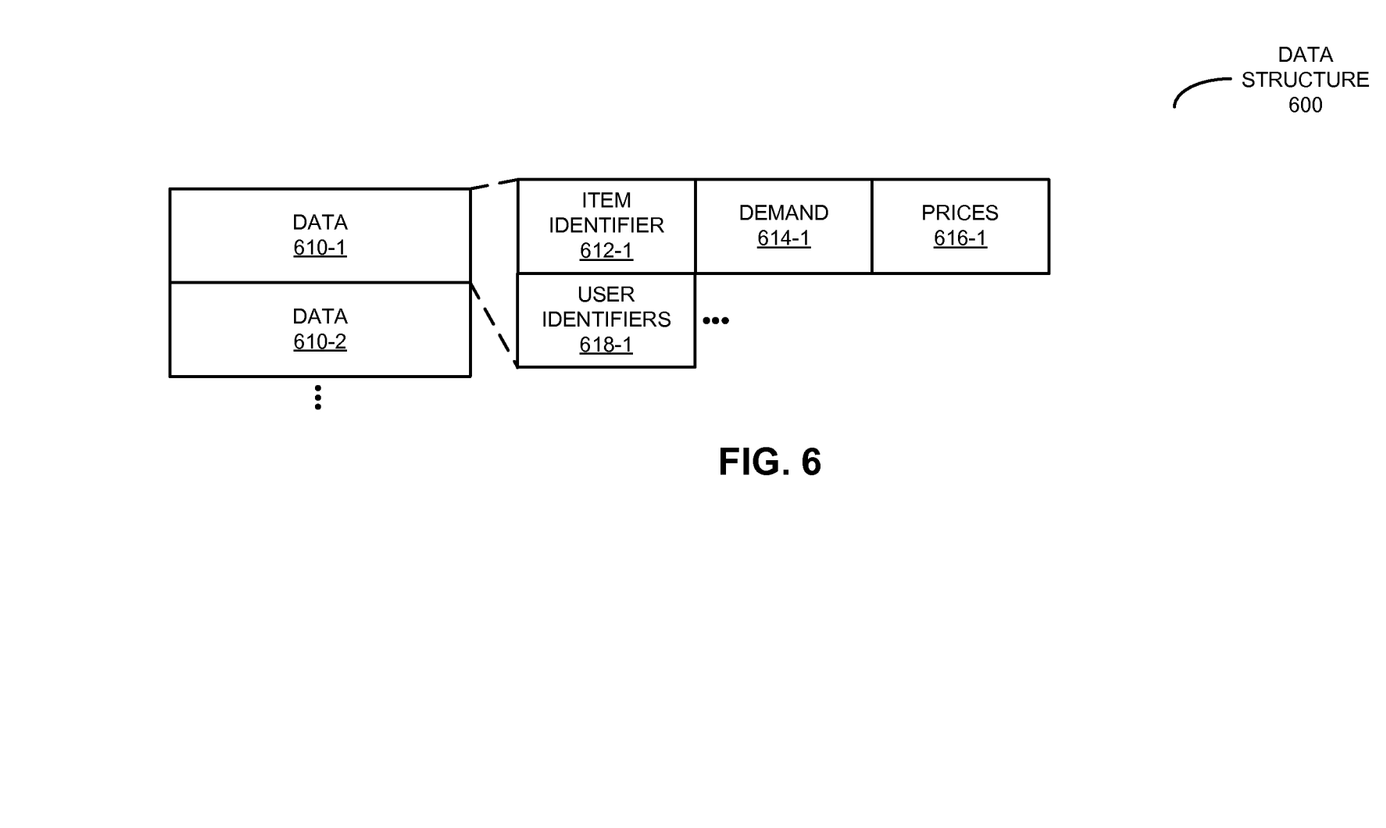
FIG. 6 is a block diagram illustrating a data structure for use in the computer system of FIG. 5 in accordance with an embodiment of the present disclosure.

Aggregated interest 546 for items 542 may be stored in a data structure, such as data structure 600 in FIG. 6. In particular, data structure 600 may include data 610 for items 542 (FIG. 5). For example, data 610-1 may include: item identifier 612-1, demand 614-1 (such as a number of consumers interested in the item), associated prices 616-1 (or price ranges) and/or user identifiers 618-1.

Referring back to FIG. 5, marketing module 532 may provide information associated with aggregated interest 546 for items 542 to at least one of providers 548. In response, this provider may sell (either directly or via computer system 500) one or more of items 542 to at least a subset 552 of users 540. This subset may be associated with one or more of the price ranges 564.

In some embodiments, based on threshold value 550 and aggregated interest 546 for the one or more of items 542, analysis module 534 may optionally determine subset 552 of users 540, and may provide information associated with subset 552 to at least one of providers 548. Furthermore, in embodiments where the sales of the one or more of items 542 is via computer system 500, marketing module 532 may provide payment information 556 that was received from the users (for example, when users 540 set up their social-network accounts 558) or may bills the users in subset 552 for the one or more of items 542. Alternatively or additionally, marketing module 532 may provide discount offers 554 to the users in subset 552.

Additionally, in some embodiments analysis module 534 determines investment-suitability metrics 560 for users 540 based on financial-transaction histories 562 of users 540. For example, financial-transaction histories 562 may be associated with optional financial software 536. Note that an investment-suitability metric for the given consumer may specify a probable return on investment associated with a discount offer made to the given consumer. These investment-suitability metrics may be provided by marketing module 532 to at least the one of providers 548, who may use this information to determine one or more selection criteria 564 that specifies users that are of interest to this provider.

Furthermore, because the information in memory 524 may be sensitive in nature, in some embodiments at least some of the data stored in memory 524 and/or at least some of the data communicated using communication module 528 is encrypted using encryption module 538. Additionally, in some embodiments one or more of the modules in memory 524 may be included in social-network software 530 and/or optional financial software 536.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 may be implemented in one or more application-specific integrated circuits (ASICs) and/or one or more digital signal processors (DSPs).

Electronic devices, computers and servers in system 400 (FIG. 4) and/or computer system 500 may include one of a variety of devices capable of manipulating computer-readable data or communicating such data between two or more computing systems over a network, including: a personal computer, a laptop computer, a mainframe computer, a tablet computer, a portable electronic device (such as a cellular phone or PDA), a server and/or a client computer (in a client-server architecture). Moreover, network 412 (FIG. 4) may include: the Internet, World Wide Web (WWW), an intranet, LAN, WAN, MAN, or a combination of networks, or other technology enabling communication between computing systems.

In exemplary embodiments, the financial-software application (i.e., optional financial software 536) includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

System 400 (FIG. 4), computer system 500 (FIG. 5) and/or data structure 600 may include fewer components or additional components. Moreover, two or more components may be combined into a single component, and/or a position of one or more components may be changed. In some embodiments, the functionality of system 400 (FIG. 4) and/or computer system 500 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for providing information associated with an aggregated interest, comprising:
receiving lists of desired items and associated prices from multiple consumers, wherein a given list is associated with a given consumer, and wherein a given item in the given list is associated with a given price, wherein the given price of a given item in a given list is based on what the given consumer wants to pay, and not based on what the provider of the given item wants to offer;
for at least one of the items, assigning, by computer, the consumers to different price ranges based on occurrences of the item in the lists of desired items and the associated prices, thereby determining the aggregated interest in the item, wherein the aggregated interest includes numbers of consumers that desire the item in the different price ranges; and
providing the information associated with the aggregated interest in the item to at least one entity that provides the item, thereby facilitating sales of the item to a subset of the consumers associated with one or more of the price ranges.

2. The method of claim 1, wherein, after providing the information, the method further comprises:
receiving sales information for the subset of the consumers from the entity, wherein the sales information includes invoices; and providing financial information associated with the subset of the consumers to the entity, thereby completing the sales of the item.

3. The method of claim 2, wherein, prior to providing the financial information, the method further comprises receiving the financial information from at least the subset of the consumers.

4. The method of claim 1, wherein, after providing the information, the method further comprises:
receiving sales information for the subset of the consumers from the entity; and
providing the sales information to the subset of the consumers.

5. The method of claim 4, wherein the sales information includes invoices or discount offers.

6. The method of claim 1, wherein, after assigning the consumers to the different price ranges, the method further comprises determining the subset of the consumers by comparing the different prices ranges to a threshold value.

7. The method of claim 1, wherein, after receiving the lists of desired items, the method further comprises providing feedback to a given consumer that indicates a probability that an associated price for the item provided by the given consumer will result in a sale of the item to the consumer by the entity.

8. The method of claim 1, wherein, prior to providing the information, the method further comprises:
estimating profitability of the sales of the item to the subset of consumers; and
providing information about the estimated profitability to the entity, thereby facilitating identification of the subset of the consumers.

9. The method of claim 1, wherein the item includes a product or a service.

10. The method of claim 1, wherein, prior to providing the information, the method further comprises:
determining investment-suitability metrics for the consumers based on financial-transaction histories of the consumers, wherein an investment-suitability metric for the given consumer specifies a probable return on investment associated with a sale made to the given consumer; and
providing the investment-suitability metrics to the entity, thereby facilitating identification of the subset of the consumers.

11. The method of claim 1, wherein the entity includes a merchant that sells the
item or a manufacturer that produces the item.

12. The method of claim 1, wherein, after assigning the consumers to the different price ranges, the method further comprises:
extracting additional information from the aggregated interest; and
providing the additional information to a third party, which can be the entity or other than the entity.

13. The method of claim 12, wherein the additional information includes: financial-forecast information, investment information, marketing information, or consumer-demand information.

14. A non-transitory computer-program product for use in conjunction with a
computer system, the computer-program product comprising a computer-readable storage medium and a computer-program mechanism embedded therein, to provide information associated with an aggregated interest, the computer-program mechanism including:

instructions for receiving lists of desired items and associated prices from multiple consumers, wherein a given list is associated with a given consumer, and wherein a given item in the given list is associated with a given price, wherein the given price of a given item in a given list is based on what the given consumer wants to pay, and not based on what the provider of the given item wants to offer;
for at least one of the items, instructions for assigning the consumers to different price ranges based on occurrences of the item in the lists of desired items and the associated prices, thereby determining the aggregated interest in the item, wherein the aggregated interest includes numbers of consumers that desire the item in the different price ranges; and
instructions for providing the information associated with the aggregated interest in the item to at least one entity that provides the item, thereby facilitating sales of the item to a subset of the consumers associated with one or more of the price ranges.

15. The computer-program product of claim 14, wherein, after the instructions for providing the information, the computer-program mechanism further includes:
instructions for receiving sales information for the subset of the consumers from the entity, wherein the sales information includes invoices; and
instructions for providing financial information associated with the subset of the consumers to the entity, thereby completing the sales of the item.

16. The computer-program product of claim 15, wherein, prior to the instructions for providing the financial information, the computer-program mechanism further includes instructions for receiving the financial information from at least the subset of the consumers.

17. The computer-program product of claim 14, wherein, after the instructions for providing the information, the computer-program mechanism further includes:
instructions for receiving sales information for the subset of the consumers from the entity; and
instructions for providing the sales information to the subset of the consumers.

18. The computer-program product of claim 14, wherein the sales information includes invoices or discount offers.

19. The computer-program product of claim 14, wherein, after the instructions for assigning the consumers to the different price ranges, the computer-program mechanism further includes instructions for determining the subset of the consumers by comparing the different prices ranges to a threshold value.

20. A computer system, comprising:
a processor;
memory; and
a program module, wherein the program module is stored in the memory and configurable to be executed by the processor to provide information associated with an aggregated interest, the program module including:
instructions for receiving lists of desired items and associated prices from multiple consumers, wherein a given list is associated with a given consumer, and wherein a given item in the given list is associated with a given price, wherein the given price of a given item in a given list is based on what the given consumer wants to pay, and not based on what the provider of the given item wants to offer;
for at least one of the items, instructions for assigning the consumers to different price ranges based on occurrences of the item in the lists of desired items and the associated prices, thereby determining the aggregated interest in the item, wherein the aggregated interest includes numbers of consumers that desire the item in the different price ranges; and instructions for providing the information associated with the aggregated interest in the item to at least one entity that provides the item, thereby facilitating sales of the item to a subset of the consumers associated with one or more of the price ranges.

* * * * *